US010408982B2

(12) United States Patent
Kim et al.

(10) Patent No.: US 10,408,982 B2
(45) Date of Patent: Sep. 10, 2019

(54) POLARIZING FILM, PREPARATION METHOD THEREOF, POLARIZING LENS COMPRISING THE SAME

(71) Applicant: Triapex Co., Ltd., Hwaseong-si (KR)

(72) Inventors: Won-Kook Kim, Suwon-si (KR); Ho Young You, Hwaseong-si (KR); Jaeil Kim, Anyang-si (KR)

(73) Assignee: TRIAPLEX CO., LTD., Hwaseong-si (KR)

( * ) Notice: Subject to any disclaimer, the term of this patent is extended or adjusted under 35 U.S.C. 154(b) by 47 days.

(21) Appl. No.: 15/569,486

(22) PCT Filed: Apr. 28, 2016

(86) PCT No.: PCT/KR2016/004472
§ 371 (c)(1),
(2) Date: Oct. 26, 2017

(87) PCT Pub. No.: WO2016/175585
PCT Pub. Date: Nov. 3, 2016

(65) Prior Publication Data
US 2018/0299598 A1 Oct. 18, 2018

(30) Foreign Application Priority Data

Apr. 29, 2015 (KR) .................. 10-2015-0060693

(51) Int. Cl.
*G02B 5/30* (2006.01)
*B32B 27/30* (2006.01)
(Continued)

(52) U.S. Cl.
CPC .............. *G02B 5/305* (2013.01); *B29C 55/02* (2013.01); *B29D 7/01* (2013.01); *B29D 11/00* (2013.01);
(Continued)

(58) Field of Classification Search
CPC .......... G02B 5/305; G02B 5/30; B29C 55/02; B29D 7/01; B29D 11/00; B29D 11/0073;
(Continued)

(56) References Cited

U.S. PATENT DOCUMENTS

2005/0219447 A1* 10/2005 Slaney ................. C08J 5/18
349/117
2007/0098999 A1* 5/2007 Berzon ............ B29D 11/00634
428/424.2
(Continued)

FOREIGN PATENT DOCUMENTS

JP  61-087757   5/1986
JP  61-285259  12/1986
(Continued)

OTHER PUBLICATIONS

EPO, Extended European Search Report of the corresponding European Patent Application No. 16786771.2., dated Mar. 16, 2018.
(Continued)

*Primary Examiner* — Frank G Font
(74) *Attorney, Agent, or Firm* — Lex IP Meister, PLLC

(57) ABSTRACT

The present invention relates to a polarizing film, a method for preparing the same, and a polarizing lens comprising the same, more specifically, to a polarizing film that has excellent optical, mechanical properties, may secure sufficient margin in a processing process, and yet, has excellent color reproducibility and small change with time elapse, a method for preparing the same, and a polarizing lens comprising the same.

10 Claims, 1 Drawing Sheet

(51) Int. Cl.
  *B29D 11/00* (2006.01)
  *B32B 27/28* (2006.01)
  *B29C 55/02* (2006.01)
  *B29D 7/01* (2006.01)

(52) U.S. Cl.
  CPC .......... *B29D 11/0073* (2013.01); *B32B 27/28* (2013.01); *B32B 27/306* (2013.01); *G02B 5/30* (2013.01); *B29D 11/00644* (2013.01); *B29D 2009/00* (2013.01)

(58) Field of Classification Search
  CPC .. B29D 11/00644; B32B 27/28; B32B 27/306
  USPC ...................................................... 359/492.01
  See application file for complete search history.

(56) References Cited

U.S. PATENT DOCUMENTS

| | | | | |
|---|---|---|---|---|
| 2007/0202265 | A1* | 8/2007 | Berzon | B29D 11/0073 427/407.1 |
| 2012/0056340 | A1* | 3/2012 | Kitagawa | B32B 41/00 264/1.34 |
| 2012/0058291 | A1* | 3/2012 | Kitagawa | G02B 5/3033 428/43 |
| 2014/0293217 | A1 | 10/2014 | Ogaya et al. | |

FOREIGN PATENT DOCUMENTS

| | | |
|---|---|---|
| JP | 62-270664 | 11/1987 |
| JP | 01-103667 | 4/1989 |
| JP | 2014-115405 | 4/2014 |
| JP | 2014-200943 | 10/2014 |
| KR | 10-2809-13128798 | 12/2009 |
| KR | 10-2014-0123599 | 10/2014 |
| KR | 10-2014-0147008 | 12/2014 |
| KR | 10-2015-0028636 | 3/2015 |
| KR | 10-2015-0043556 | 4/2015 |
| WO | 2014-021466 | 2/2014 |
| WO | 2014-030814 | 2/2014 |
| WO | 2014-088122 | 6/2014 |
| WO | 2015-046936 | 4/2015 |

OTHER PUBLICATIONS

KIPO, PCT Search Report & Written Opinion of PCT/KR2016/004472 dated Aug. 8, 2016.

* cited by examiner

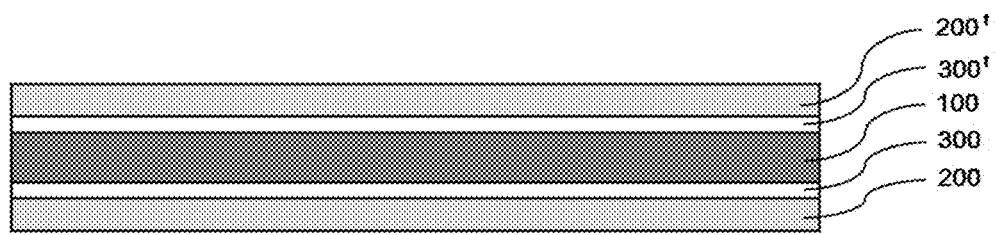

POLARIZING FILM, PREPARATION METHOD THEREOF, POLARIZING LENS COMPRISING THE SAME

CROSS REFERENCE TO RELATED APPLICATIONS

This application claims the benefit of Korean Patent Application No. 10-2015-0060693 filed on Apr. 29, 2015 with the Korean Intellectual Property Office, the disclosures of which are herein incorporated by reference in their entirety.

FIELD OF THE INVENTION

The present invention relates to a polarizing film, a method for preparing the same, and a polarizing lens comprising the same, more specifically, to a polarizing film that has excellent optical, mechanical properties, exhibits improved processibility, and yet, has excellent color reproducibility particularly when preparing an urethane polarizing lens, a method for preparing the same, and a polarizing lens comprising the same.

BACKGROUND ART

A polarizing lens transmits only polarized light compared to non-polarized light using polarization phenomenon. Particularly, it blocks transmission of direct light or reflected light by diffused reflection and the like, and transmits only polarized light, thereby protecting eyes from the light source, and providing clear sight even in the state of reflected light or back light, and thus, it may secure sufficient sight at the time of automobile driving as well as sport and leisure activities, thus increasing stability.

In general, in case of a polarizing film for polarizing lens, a polymer film such as polyvinyl alcohol (PVA) and the like drawn to orient the molecules inside the film toward a specific direction exhibiting polarization property is used. In other words, it is prepared by a method of uniaxially drawing a polyvinyl alcohol film to orient the molecules inside the film in the uniaxial direction as drawn, dyeing with dichromic dye, and then, drying, or by a method of uniaxially drawing a polyvinyl alcohol film dyed with dichromic dye, and drying, and the like, wherein various colors may be realized by the combination of dichromic dyes.

Since a polyvinyl alcohol polarizing film has a property of being destroyed such as cracked or broken and the like instead of causing plastic deformation, when external force is applied (brittleness), it is very difficult to form into a circular cross section, namely, a lens shape, and it cannot be processed in a lens shape through a simple punching process and the like.

Thus, in general, a polyvinyl alcohol film for polarizing lens is prepared by forming into a lens shape in the film state, and then, removing surplus parts (trimming process). However, this method has a problem in that a large area of the polyvinyl alcohol film is lost during the forming and trimming processes.

And, when a lens is manufactured using the above-prepared polyvinyl alcohol polarizing film for polarizing lens, it is often required to separately treat with a primer so as to secure adhesion with resin for lens in order to add a plastic layer for lens and the like.

Thereafter, the primer-treated polarizing film for a polarizing lens is inserted into a glass mold including a gasket designed in a specific shape, plastic resin for lens is injected, and then, thermal polymerization is conducted to form a polarizing lens, wherein a problem is often generated in that residual stress of the polyvinyl alcohol polarizing film is relaxed by external heat to change appearance, thereby damaging optical properties or polarization properties.

In order to overcome such disadvantages, Korean Laid Open Patent Publication No. 2009-0128790 discloses a technology of laminating a triacetyl cellulose (TAC) film coated with a primer having excellent adhesion force with plastic resin for CR lens as a protection film of the polyvinyl alcohol polarizing film, and then, processing into a lens shape through punching and curving.

Meanwhile, recently, as plastic casting lens material, i.e., plastic resin for lens, polyurethane-based resin is used a lot, and since the polyurethane-based resin has relatively high refractive index and excellent lens processibility and mechanical properties, it is being rapidly spread in the market.

In case a lens is manufactured using the polyurethane-based material as plastic resin for lens, a thermal polymerization process should be passed at higher temperature for longer time than other material, and thus, when a urethane polarizing lens is manufactured, discoloration is generated in the polarizing film, rendering it difficult to control the colors, thereby significantly decreasing the final yield compared to lens of other material, and significantly increasing manufacture cost of the product.

Korean Laid Open Patent Publication No. 2014-01235599 discloses polyurethane-based plastic polarizing lens in which both sides of a polyethyleneterephthalate (PET) polarizing film are primer-treated with a coating solution containing urethane-based resin to increase adhesion with urethane-based resin. However, since the primer containing urethane-based resin is in the form of prepolymer of a compound having a hydroxyl (—OH) group and a compound having a diisocyanate group, and easily reacts with moisture, adhesion force with resin may remarkably decrease or discoloration may be generated according to surrounding environment or time elapse. Such disadvantage becomes more problematic if storage and transfer time of the polarizing film until it is prepared into a polarizing lens shape becomes longer, and becomes a fatal obstacle to the commercial application of the polarizing film.

Accordingly, there is a continued demand for studies on a polarizing film that can be applied for lens made of polyurethane-based material with excellent mechanical properties, and yet, has little damage of the optical property and polarization property of the polarizing film even with time elapse, and furthermore, can secure sufficient margin in the processing process.

SUMMARY OF THE INVENTION

It is an object of the invention to provide a polarizing film that has excellent polarization and mechanical properties, and yet, has excellent adhesion to polyurethane-based material, and thus, may secure sufficient margin in the processing process, and has little or does not have damage of optical property and polarization property with time elapse, a method for preparing the same, and a polarizing lens comprising the same.

The present invention provides a polarizing film comprising a transparent film substrate; a first polyvinyl alcohol-based resin layer formed on one side of the transparent film substrate; and a second polyvinyl alcohol-based resin layer formed on the other side of the transparent film substrate, wherein at least one of the first and the second polyvinyl alcohol-based resin layers is a polarizing resin layer.

And, the present invention provides a polarizing lens comprising the polarizing film.

And, the present invention provides polarizing eyeglasses comprising the polarizing lens.

And, the present invention provides a method for preparing a polarizing film comprising the steps of: forming a first adhesive layer on one side of a transparent film substrate; forming a first polyvinyl alcohol-based resin layer on the first adhesive layer; forming a second adhesive layer on the other side of the transparent film substrate; and forming a second polyvinyl alcohol-based resin layer on the second adhesive layer, wherein at least one of the first and the second polyvinyl alcohol-based resin layers is a polarizing resin layer.

ADVANTAGEOUS EFFECTS OF THE INVENTION

The polarizing film of the present invention has excellent polarization property and mechanical properties such as strength and hardness and the like, and has excellent adhesion between layers, and thus, may inhibit damage of the polarizing film in the processing process for preparing the above-explained polarizing lens, thus securing sufficient margin. And, it is hardly discolored during transfer, storage and lens preparation processes, thus affording excellent color reproducibility of a polarizing lens.

And, since the polarizing film has excellent adhesive property with other polymer resin such as urethane resin and the like on the outermost side, adhesion of the film with other polymer resin such as urethane resin and the like may be improved without a separate primer treatment, and decrease in adhesive power is hardly generated according to time elapse. Thus, the polarizing film of the present invention may be manufactured in the form further comprising only a protection film or a release film for transportation or storage on a polarizing layer.

BRIEF DESCRIPTION OF THE DRAWINGS

FIG. 1 shows the cross section of the polarizing film according to one example of the invention.

DETAILED DESCRIPTION OF EXEMPLARY EMBODIMENTS

The polarizing film of the present invention comprises a transparent film substrate; a first polyvinyl alcohol-based resin layer formed on one side of the transparent film substrate; and a second polyvinyl alcohol-based resin layer formed on the other side of the transparent film substrate; wherein at least one of the first and the second polyvinyl alcohol-based resin layers is a polarizing resin layer.

And, the polarizing lens of the present invention comprises the polarizing film.

And, the polarizing eyeglasses of the present invention comprise the polarizing lens.

And, a method for preparing the polarizing film of the present invention comprises the steps of: forming a first adhesive layer on one side of a transparent film substrate; forming a first polyvinyl alcohol-based resin layer on the first adhesive layer; forming a second adhesive layer on the other side of the transparent film substrate; and forming a second polyvinyl alcohol-based resin layer on the second adhesive layer; wherein at least one of the first and the second polyvinyl alcohol-based resin layers is a polarizing resin layer.

As used herein, terms "a first", "a second" and the like are used to explain various elements, and they are used only to distinguish one element from other elements.

And, the terms used herein are only to explain illustrative examples, and are not intended to limit the invention. A singular expression includes a plural expression thereof, unless it is expressly stated or obvious from the context that such is not intended. As used herein, the terms "comprise", "equipped" or "have" and the like are intended to designate the existence of practiced characteristic, number, step, element or combinations thereof, and they are not intended to preclude the possibility of existence or addition of one or more other characteristics, numbers, steps, elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

The polarizing film according to one aspect of the present invention comprises a transparent film substrate; a first polyvinyl alcohol-based resin layer formed on one side of the transparent film substrate; and a second polyvinyl alcohol-based resin layer formed on the other side of the transparent film substrate; wherein at least one of the first and the second polyvinyl alcohol-based resin layers is a polarizing resin layer.

As explained above, as a polarizing film used for polarizing eyeglasses and the like, a polarizing film wherein an adhesive layer lies on one side or both sides of a polarizing layer that is formed by uniaxially drawing a polymer film such as polyvinyl alcohol and the like and dyeing with dichromic dye, and a polymer film sheet having excellent mechanical properties such as a polycarbonate sheet and the like is attached as a protection layer is generally used.

A polymer film sheet used in the protection layer has excellent impact resistance and simultaneously has high heat resistance, and thus, it is used a lot in polarizing lens such as sunglasses or goggles obtained by conducting bending work or extrusion molding and the like.

However, if a polarizing film is prepared in the structure equipped with the protection layers on both sides, when bending work into a spherical or non-spherical shape is conducted such as in sunglasses or goggles, colored interference fringe is easily generated due to phase difference in the protection layers. Such a colored interference fringe has problems of damaging the appearance of a polarizing film, causing eye fatigue, and the like. And, in case a polarizing film with a monolayer structure is used, as explained above, due to the mechanical properties such as brittleness of a polyvinyl alcohol-based film, and the like, it is difficult to conduct a punching process, folding or breakage may occur in handling, and forming failure is often generated at the time of curved surface forming. And, since in a high temperature process required for lens forming, discoloration and distortion of curved surface are often generated due to temperature and moisture, it becomes difficult to sufficiently secure process margin, thus decreasing final lens yield.

And, although there is a way to use a polarizing film obtained by dyeing with dichromic dye on heat resistant thermoplastic polyester instead of the polyvinyl alcohol-based polarizing film and forming it into a film shape, and subsequently, uniaxially drawing the obtained film, and then, heat treating, it has low adhesion with other resin such as polycarbonate and requires primer treatment so as to process into a polarizing lens, thus making the process complicated. And, even if primer treated, as time lapses, adhesive power may decrease due to the interaction between primer ingredients or absorption of surrounding moisture.

Accordingly, the polarizing film according to one aspect of the invention comprises a transparent film substrate; a first polyvinyl alcohol-based resin layer formed on one side of the transparent film substrate; and a second polyvinyl alcohol-based resin layer formed on the other side of the transparent film substrate; wherein at least one of the first and the second polyvinyl alcohol-based resin layers is a polarizing resin layer.

According to one embodiment of the invention, the transparent film substrate is not specifically limited as long as it is optically transparent, and for example, it may comprise one or more polymer resins selected from the group consisting of cellulose acetate-based resin, cellulose acetate butyrate-based resin, polyethylene terephthalate-based resin, (meth)acrylate-based resin, polycarbonate-based resin, and polyamide-based resin.

Among them, it is preferable to use a film that does not significantly differ from resin for a urethane lens in terms of thermal, mechanical properties, and a film that has small in-plain retardation value, has excellent optical properties and is easily formed into a lens shape is preferable.

And, if necessary, a functional transparent film substrate may be used that is prepared by a method of coating or blending functional dye or photochromic dye on polymer resin for a transparent support film, and then casting, and the like.

The cellulose acetate-based resin may include triacetyl cellulose (TAC) resin commonly used in a polarizing plate, and the like, and the polycarbonate-based resin may include aliphatic or aromatic polycarbonate resin, and the like.

Particularly, in case the transparent film substrate comprises polycarbonate-based resin or polyamide-based resin, and the like, the polarizing film may have very excellent impact resistance and heat resistance, and thus, may be used in lens such as sunglasses for sport and leisure for eye protection, or military bulletproof goggles, and the like.

And, according to yet another embodiment of the invention, the polyvinyl alcohol-based resin layer may be formed of a polyvinyl alcohol film, and at least one layer of the first and the second polyvinyl alcohol-based resin layers may be a transparent film dyed using dichromic dye so as to afford polarization property.

Since polyvinyl alcohol resin has excellent drawing processibility, and particularly, has excellent adhesion with the transparent film substrate, it may be preferably used as a film for a polarizing layer.

And, in the preparation of common polarizing lens, in case protection layers are formed on both sides of a polarizing film, the protection layer is located on the outermost part of the polarizing film, and thus, when another coating layer is formed thereon, it is necessary to treat with a separate primer or a separate adhesive layer. To the contrary, in the polarizing film according to one embodiment of the invention, hydrophilic polymer, polyvinyl alcohol-based resin is used as a film for forming a polarizing layer, and it has very excellent adhesion with urethane or thiourethane polymer resin, and thus, a coating layer comprising urethane or thiourethane polymer resin may be easily formed without a separate primer treatment.

Wherein, the first polyvinyl alcohol-based resin layer and the second polyvinyl alcohol-based resin layer, which are identical or different, may be each independently formed of a colorless transparent polyvinyl alcohol-based film, or a colored transparent polyvinyl alcohol-based film, and the transparent film substrate may be also a colorless transparent film substrate or a colored transparent film substrate.

Thus, according to one embodiment of the invention, the polarizing film may have a multilayered structure of at least 3 layers. Specifically, for example, in case a colorless transparent film substrate is used as the transparent film substrate, the polarizing film may have structure and color combinations of i) (colored transparent polyvinyl alcohol-based film)/colorless transparent film substrate/(colorless transparent polyvinyl alcohol-based film), ii) (colorless transparent polyvinyl alcohol-based film)/colorless transparent film substrate/(colored transparent polyvinyl alcohol-based film), or iii) (colored transparent polyvinyl alcohol-based film)/colorless transparent film substrate/(colored transparent polyvinyl alcohol-based film), and in case a colored transparent film substrate is used as the transparent film substrate, the polarizing film may be formed in various structure and color combinations such as iv) (colored transparent polyvinyl alcohol-based film)/colored transparent film substrate/(colorless transparent polyvinyl alcohol-based film), v) (colorless transparent polyvinyl alcohol-based film)/colored transparent film substrate/(colored transparent polyvinyl alcohol-based film), or vi) (colored transparent polyvinyl alcohol-based film)/colored transparent film substrate/(colored transparent polyvinyl alcohol-based film), and the like.

When the polyvinyl alcohol-based film or the transparent film substrate is 'colorless', it means that the polyvinyl alcohol-based film or the transparent film substrate transmit light with all wavelengths of visible light range at the same ratio literally without color, and 'colored' means that the polyvinyl alcohol-based film or the transparent film substrate is dyed or colored with chromatic or achromatic dye, and the like, and it transmits visible light with specific wavelength range under specific conditions, or absorbs visible light with specific wavelength range, to realize a certain color or realize different colors according to light irradiation conditions (photo-chromic).

Namely, the polarizing film according to one embodiment of the invention may have a multilayered structure as in the above-explained combinations, and be realized in various colors.

And, the colored transparent polyvinyl alcohol-based film may be a colored polarizing film that is prepared by uniaxially drawing a polyvinyl alcohol-based film to orient in the uniaxial direction where the molecules inside the film are drawn, dyeing with dichromic dye, and then, drying, and thus, has polarization property.

As the dichromic dye, dyes commonly used for preparing colored polyvinyl alcohol films in the technical field to which the invention pertains may be used without specific limitations, but preferably, azo-based dyes may be used. The azo-based dye may include, for example, C.I. Direct Yellow 87, C.I. Direct Yellow 86, C.I. Direct Orange 39, C.I.28160, C.I.29315, C.I.24895, C.I.23630, C.I.24410, C.I.24400, C.I.30295, C.I.342000, C.I. Direct Blue 71, C.I. Direct Blue 293, C.I. Direct Blue 200, C.I.20470, and the like. In addition to the azo-based dye, anthraquinone or quinophthalone-based dye may be used as long as it contains water-soluble ion groups or amine, acetic acid. Specific examples thereof are disclosed in Japanese Laid Open Patent Publication No. Sho 61-087757, Japanese Laid Open Patent Publication No. Sho 61-285259, Japanese Laid Open Patent Publication No. Sho 62-270664, Japanese Laid Open Patent Publication No. Hei 1-103667, and the like.

Such dichromic dye may be used alone or in combination of yellow, red, blue, and the like, to realize aimed color.

The above-explained dye may be used to prepare a colored polyvinyl alcohol film by dyeing a polyvinyl alcohol film in an aqueous solution in which the dye is dissolved at the total concentration of less than about 2% at room temperature to about 60° C., and then, allowing it to stay in a solution in which additives such as metal ions and boric acid and the like are dissolved, and drying, and the colored polyvinyl alcohol film may be prepared with the final draw ratio of about 200 to about 800% in the total process.

According to one embodiment, it is preferable that the polarizing film comprises a transparent film substrate; and a first and a second polyvinyl alcohol-based resin layers formed on both sides of the transparent film substrate, and both the first and the second polyvinyl alcohol-based resin layers have polarization properties, wherein both films are dyed with the above-explained dichromic dye.

In this case, since the polarizing film comprises polarization layers formed on both sides of the transparent film substrate, by controlling the angle of the polarization planes of two polarization layers, additional effects of controlling the amount of transmitted light and increasing polarization rate may be expected.

According to one embodiment of the invention, only the first polyvinyl alcohol-based resin layer formed on one side of the transparent film substrate may be made to have polarization property, and only the second polyvinyl alcohol-based resin layer formed on the other side may be included as a colorless transparent film that does not have polarization property. The colorless transparent film which does not have polarization property functions for contributing to improvement of adhesion with other resin such as urethane resin. And, the colorless transparent film that does not have polarization property may be formed by coating a polyvinyl alcohol-based resin composition on one side of the transparent film substrate by dip coating, and the like, so as to be directly formed on the transparent film substrate.

According to another embodiment of the invention, the transparent film substrate and the first and second polyvinyl alcohol-based resin layer may be attached by an adhesive layer comprising a non-aqueous adhesive, an aqueous adhesive, or a mixture thereof.

Examples of the non-aqueous adhesive may include polyol-based adhesive including polyester polyol, polyether polyol, polycarbonate polyol, polycaprolactone-based polyol, and the like;

solvent-type polyurethane-based adhesive obtained by dissolving polyurethane resin into which aliphatic polyisocyanate including isophorone diisocyanate (IPDI), hexamethylene diisocyanate (HDI), 4,4-dicyclohexylmethane diisocyanate (H12MDI), tetramethylxylylene diisocyanate (TMXDI), and the like, and derivatives thereof; or aromatic polyisocyanate including toluene diisocyanate (TDI), diphenylmethane diisocyanate (MDI), and the like, and derivatives thereof is introduced, in single or multiple solvents including acetate-based and/or ketone-based solvents; and urethane acrylate-based adhesive obtained by reacting urethane prepolymer with relatively low polymerization degree that is treated with isocyanate at the end of polyurethane as explained above, with (meth)acrylate monomer including 2-hydroxyethyl (meth)acrylate, 2-hydroxypropyl (meth)acrylate, 2-hydroxybutyl (meth)acrylate, 4-hydroxycyclohexyl (meth)acrylate, and the like.

And, in case the urethane acrylate-based adhesive, and the like is used, it is possible to use photo-reactive adhesive wherein a photopolymerization initiator is introduced into a composition diluted with low molecular acrylate-based monomers such as isobornyl acrylate, cyclohexyl acrylate, morpholine acrylate, 1,6 hexanediol diacrylate, polyethylene glycol diacrylate, and the like, which are easily penetrated into the transparent film substrate.

And, the polyurethane resin and isocyanate may use plural polyols and polyisocyanates if necessary, and the above-explained low molecular acrylate-based monomers or photopolymerization initiators may be used in combinations of various kinds thereof, and may be diluted with ketone-based or actate-based solvent, if necessary. And, it is also possible to leave a part as an isocyanate end, or additionally add a polyisocyanate curing agent to use as a photocurable and thermosetting adhesive.

In case non-aqueous adhesive is used, poor appearance such as bubble generation and the like may be prevented simply by drying within a relatively short time, in the prepared polarizing film.

The aqueous adhesive may include, for example, polyvinyl alcohol-based adhesive, polyethyleneimine-based adhesive, polycarboxylic acid-based adhesive, epoxy-based adhesive, aldehyde-based adhesive, and water-dispersed polyurethane-based adhesive, and the like.

As the polyvinyl alcohol-based adhesive, those having saponification degree allowing it to dissolve in water are preferable, and those having saponification degree of about 70 to about 99%, preferably into which a very small amount of acetoacetyl group or sulfonic acid group and the like are introduced so as to facilitate chelation with a metal oxide or a coupling agent may be used, and it is preferable to use resin with polymerization degree of about 500 to about 2000. If polymerization degree is too low, cohesiveness in the adhesive layer is weak, and thus, heat resistance and water resistance are inferior, and at the time of winding by a roll-to-roll process, press mark is easily generated due to extraneous material. And, if polymerization degree is too high, viscosity may be high, thus easily generating bubbles or non-laminated part.

As the water-dispersed polyurethane, anionic water-dispersed polyurethane into which dimethylolpropionic acid (DMPA), dimethylolbutanoic acid (DMBA) and the like is introduced, or cationic water-dispersed polyurethane into which N-methyl-diethanolamine (MDEA) and the like is introduced may be used, wherein as a curing agent, blocked polyisocyanate, carbodiimide (anionic polyuyrethane), epoxide (anionic), and the like may be used.

The aqueous adhesive is favorably used for lamination of a cellulose-based film that is commonly prepared by a solution casting process and has very low in-plain retardation with a PVA film.

The aqueous adhesive, or non-solvent type photocurable adhesive among the non-aqueous adhesive may simultaneously add three films of the first and second polyvinyl alcohol-based resin layers and the transparent film substrate on a roll laminator with a precision metering pump and laminate them, and thus, is advantageous in terms of productivity.

The thickness of the adhesive may be controlled by roll gap and pressure, and if the roll gap is large, it is favorable for adhesion, but non-lamination faulty may be generated if the amount of adhesive added is insufficient, and if the roll gap is too narrow, adhesion may be weak, and thus, lamination should be progressed with appropriate add speed, roll gap and pressure, according to the viscosity and properties of adhesive.

In the case of organic solvent-based adhesive, it is coated on the first and the second polyvinyl alcohol-based resin layers and/or the transparent film substrate, and the solvent is dried, and then, lamination is conducted. In other words, a process of coating, drying and lamination (UV or heat curing) should be passed, and thus, it is unfavorable in terms of productivity of a polarizing film; however, since the amount of remaining moisture on a polarizing film is smaller than the aqueous adhesive, remaining moisture of a polarizing film may be removed simply by heat treatment within a relatively short time immediately before preparation of a polarizing lens, and thus, it is favorable in terms of productivity of a polarizing lens.

FIG. 1 shows the cross section of the polarizing film according to one embodiment of the invention.

Referring to FIG. 1, the polarizing film according to one embodiment of the invention comprises a transparent film substrate (100); a first polyvinyl alcohol-based resin layer formed on one side of the transparent film substrate (200); and a second polyvinyl alcohol-based resin layer formed on the other side of the transparent film substrate (200'), wherein the transparent film substrate (100) and the first and the second polyvinyl alcohol-based resin layers (200, 200') may be attached by a first adhesive layer (300) and a second adhesive layer (300'), respectively comprising an aqueous adhesive, a non-aqueous adhesive or a mixture thereof.

Since the polarizing film according to one embodiment of the invention uses only single transparent film substrate that is included in the internal center of the film, stripe generation due to in-plane retardation, which may appear when using plural supports, may be prevented.

And, since it uses only single transparent film substrate and does not comprise plural layers having high hardness and strength, degradation of the edges of the film, delamination of the side layers, damage of optical properties, and the like may be prevented in the process of bending, punching, thermoforming and the like.

And, since the transparent film substrate, and the first and the second polyvinyl alcohol-based resin layer are attached by an adhesive layer comprising an aqueous adhesive, a non-aqueous adhesive or a mixture thereof, adhesion therebetween is very excellent.

For the above reason, the polarizing film of the present invention may sufficiently secure process margin in the preparation process of lens and the like, and remarkably improve general preparation yield.

According to another embodiment of the invention, the transparent film substrate may have a thickness of about 40 μm to about 1,000 μm, preferably, about 40 μm to about 500 μm, or about 40 μm to about 300 μm. As the thickness of the transparent film substrate is set within the above range, the prepared polarizing lens may achieve sufficient mechanical properties including hardness, strength, impact resistance, and the like.

And, the thicknesses of the first and the second polyvinyl alcohol-based resin layers may be independently, variously controlled within the range of a few hundred nanometers to a few hundred microns according to the use. For example, the lower limit of the thickness may be about 100 nm, or about 300 nm, or about 500 nm, or about 1 μm, or about 10 μm, or about 15 μm, and the upper limit may be about 100 μm, or about 80 μm, or about 50 μm, or about 40 μm, or about 10 μm, or about 5 μm. Particularly, if the first and the second polyvinyl alcohol-based resin layers are formed by above-explained dip coating method, it is possible to thinly form with a thickness of a few hundred nanometers to a few microns, for example, about 100 nm to about 5 μm, or about 100 nm to about 1 μm.

The polarizing lens according to another aspect of the invention comprises the polarizing film.

The polarizing lens may use the polarizing film alone, or it may comprise the polarizing film and a urethane or thiourethane-based lens, by additionally forming a coating layer comprising urethane or thiourethane-based resin on the polarizing film.

According to one embodiment of the invention, the polarizing lens may be processed in the form of lens having a polyurethane resin protection layer, by punching and trimming the polarizing film, placing it in a mold, and then, injecting polyurethane-based resin and heat curing, but is not limited thereto, and besides, it may be processed in the form of lens by methods commonly used in the technical field to which the invention pertains.

According to still another aspect of the invention, provided are polarizing eyeglasses comprising the polarizing lens. Since the polarizing eyeglasses comprise the polarizing lens using the polarizing film of the present invention, it may have excellent hardness, strength, impact resistance and heat resistance, and particularly, it may be processed in the form of polarizing sunglasses for sport and leisure, or military bullet-proof goggles.

Meanwhile, a method for preparing a polarizing film according to another aspect of the invention comprises the steps of: forming a first adhesive layer on one side of a transparent film substrate; forming a first polyvinyl alcohol-based resin layer on the first adhesive layer; forming a second adhesive layer on the other side of the transparent film substrate; and forming a second polyvinyl alcohol-based resin layer on the second adhesive layer; wherein at least one of the first and the second polyvinyl alcohol-based resin layers is a polarizing resin layer.

In the preparation method, the transparent film substrate, adhesive layer, and polyvinyl alcohol-based resin are as explained above with regard to the polarizing film, and the detailed explanations thereof are omitted.

The method for forming the first and the second polyvinyl alcohol-based resin layers are not specifically limited, and may be formed by a method commonly used in the technical field to which the invention pertains. For example, the first and the second polyvinyl alcohol-based resin layers may be formed first, and then, they may be respectively laminated on both sides of the transparent film substrate. According to one embodiment of the invention, one layer of the first and the second polyvinyl alcohol-based resin layers may be formed by dipping in a coating solution comprising polyvinyl alcohol-based resin and then drying, according to a dip coating method.

Hereinafter, the action and the effects of the invention will be explained in more detail with reference to specific examples. However, these examples are only presented to illustrate the invention, and the scope of the invention is not limited thereto.

Preparation of a Transparent Film for Forming a Polyvinyl Alcohol (PVA)-Based Resin Layer

PREPARATION EXAMPLE 1

Preparation of a Colored Transparent PVA Film

A poly vinyl alcohol (PVA) film (polymerization degree 2,400, saponificaton degree 99%, thickness 60 μm, Nippon Gohsei Corporation, M-6000) was swollen at 33° C. within 1 minute.

Dyes of C.I. Direct Blue 200, C.I. Direct blue 293, C.I. 28160, C.I. 40215 were combined, the above PVA film was immersed therein at 40° C. for 1 minute, and then, fixed in 1.5 wt % boric acid aqueous solution for 40 seconds, and washed and dried, and dyed and drawn by a roll-to-roll process such that the final draw ratio became 400%. The drying was conducted at 75° C. for 1 minute, and after waiting until the appearance was stabilized, a colored transparent PVA film was manufactured such that the color coordinate of the first 1 m central part realizes color index of L* 47, a* −5, b* −5.

The polarization rate ($P_e$) was measured and calculated according to the following Equation 1 by ISO 4007, and the polarization rate of the sheet was measured as 99.5%.

$$Pe=(Tp\max-Tp\min)/(Tp\max+Tp\min) \quad \text{[Equation 1]}$$

In the Equation 1, a standard polarizing plate with polarization rate of 99.95% or more and a PVA transparent film to be measured were overlapped, and a transmission rate when it becomes maximum is designated as Tpmax, and a transmission rate when it becomes minimum is designated as Tpmin.

PREPARATION EXAMPLE 2

Preparation of a Colored Transparent PVA Film

A colored transparent PVA film was manufactured by the same method as Preparation Example 1, except that the color coordinate of the first 1 m central part is made to realize color index of L* 67, a* −0.8, b* −8.7.

The polarization rate ($P_e$) was measured as 96.8%.

PREPARATION EXAMPLE 3

Preparation of a Colorless Transparent PVA Film

A colorless transparent PVA film that does not have polarization property was manufactured by the same method as Preparation Example 2, except that the polyvinyl alcohol film was immersed in distilled water instead of dye at 40° C. for 1 minute.

Preparation of Adhesive for Forming an Adhesive Layer

PREPARATION EXAMPLE 4

3 l of distilled water was introduced into a 5 l beaker, it was placed on a hot plate of 30° C., and after waiting until the temperature of the distilled water became 30° C., 100 g of PVA powder (Z200, Nippon Gohsei Corporation) into which a small amount of acetoacetyl group was introduced was gradually introduced with care so as not to generate agglomeration or lump.

After stirring for 1 hour, the temperature of the hot plate was set to 90° C., and after waiting until the temperature of the aqueous solution in the beaker became 90° C., the solution was stirred for 1 hour, and it was confirmed with the naked eyes that the PVA powder is completely dissolved The solution was gradually naturally cooled with stirring at room temperature, and as a curing agent, Safelink SPM-01 (Nippon Gohsei Corporation) was introduced into the PVA aqueous solution with slowly stirring such that it became 7 wt % based on the weight of PVA, thus preparing an aqueous PVA adhesive.

PREPARATION EXAMPLE 5

In a three neck reactor, a cooler, a vacuum apparatus, and a nitrogen introduction apparatus were installed, 600 g of polyester polyol (Heung-il Polyol HP-1010, 0.6 mole) and 100 g of polyethylene glycol (KPX Green Polymer Konion PEG 1000, 0.1 mol) were introduced into the reactor, and the remaining moisture was removed at 90° C. under complete vacuum for about 2 hours.

262 g of 4,4'-dicyclohexylmethanediisocyanate (Bayer Desmodur W 1 mol) was introduced, and reacted at 90° C. for 1 hour, and then, 0.1 g of tin-based catalyst dibutyltin dilaurate (Air Products T-12) was added, and thereafter, reaction was progressed for 3 hours.

Thereafter, when NCO % was 2.5% (theoretical value 2.61%), 30 g of neophentyl glycol (LG Chem NPG 0.3 mol) and 50 g of ethyl acetate were introduced, and if reaction viscosity increased, each 50 g were additionally introduced to reach total 1000 g, and they were reacted until NCO peak disappeared at IR measurement.

As a viscosity dilution solvent, 400 g of methylisobutyl ketone was introduced, and then, 1-methoxypropan-2-ol was additionally introduced such that the solid content became 30 wt %. Thereafter, based on the main material, 3 parts of isophorone diisocyanate trimer (Bayer Desmodur Z4470BA, 70% solution) and 2 parts of hexametylene diisocyanate trimer (Bayer Desmodur N3300) as curing agents were introduced, followed by slowly stirring for 1 hour and then defoaming to prepare a non-aqueous adhesive.

Manufacture of a Polarizing Lens

COMPARATIVE EXAMPLE 1

Manufacture of a Polarizing Film with PVA Monolayer

The colored transparent PVA film manufactured in Preparation Example 1 was cut to a size of 11 cm×11 cm.

In the lower section mold of a 4Base curve hot press curved-surface forming machine (radius of curvature 150 mm) capable of precision controlling the position of curved-surface machined press with a servo motor, the edges of the colored transparent PVA film were fixed, and after press forming at 85° C., the edge parts were removed by laser cutting. Thereafter, the direction of a polarizing axis was marked to manufacture a PVA monolayered polarizing film, which was formed with the final diameter of 79.8 mm, 4 base curved-surface (radius of curvature: 150 mm).

By the same method, total 27 sheets were taken from 340 mm width, 1 m length, to manufacture the same PVA monolayered polarizing films, and except 5 wherein faulty was generated such as folding in the manufacturing process, press due to the introduction of extraneous material, curved-surface forming faulty, and the like, total 22 curved-surface formed PVA monolayered polarizing films were obtained.

Among the manufactured PVA monomolayered polarizing films, 5 samples were randomly taken, and changes in color coordinate and polarization rate before and after forming were measured.

Manufacture of Polarizing Lens

The 22 PVA monolayered polarizing films were dried at 70° C. within 5 minutes to remove the remaining moisture.

A glass mold for forming polarizing lens with the thickness of the lens center of 1 mm and 4Base curved-surface was prepared on the front side and the back side, and fixed using a circular gasket made of silicon, having a gap so that the PVA monolayered polarizing film may be inserted.

Next, a resin mixture for (thio)urethane lens with refractive index of 1.60 (Mitsui Chemicals, Inc., MR-8) was injected into the mold, it was confirmed if MR-8 resin was filled sufficiently on both sides of the polarizing film, the mold was put in an oven, and the temperature was raised from 25° C. to 120° C. over 15 hours, and then, maintained at 120° C. for 1 hours.

After slowly cooling, the lens mold was taken out of the oven. Lens was released from the lens mold, and annealed at 120° C. for 2 hours 30 minutes to obtain polarizing lens of a semi-finish lens shape. Thereafter, the back side was cut and ground to obtain lens of 4Base shape.

Among them, in 4 lens, problems were generated such as crushing of curved-surface at the time of inserting a gasket, distortion of curved-surface at the time of polymerizing MR-8 lens resin, and finally, 18 good polarizing lens were manufactured.

Among the manufactured 18 polarizing lens, 5 were randomly taken and broken with a hammer to confirm adhesion between the polarizing film and the urethane lens, as a result of which excellent adhesion with little scattering was confirmed.

In order to measure changes in the colors and the polarization rates of the polarizing lens manufactured by the above method, color coordinate and polarization rate after curved-surface forming were measured, and summarized in the following Table 1.

TABLE 1

| | D65/2 | Polarizing film before thermoforming | Polarizing film after hermoforming | Polarizing lens |
|---|---|---|---|---|
| Lens1-1 | L* | 46.06 | 45.65 | 38.97 |
| | a* | −4.83 | −4.82 | −13.49 |
| | b* | −5.54 | −5.36 | −9.29 |
| | PE (%) | 99.63 | 99.60 | 99.30 |
| Lens1-2 | L* | 45.58 | 45.27 | 41.47 |
| | a* | −5.47 | −5.45 | −11.80 |
| | b* | −6.82 | −6.57 | −8.04 |
| | PE (%) | 99.62 | 99.65 | 99.32 |
| Lens1-3 | L* | 47.34 | 46.91 | 45.99 |
| | a* | −4.76 | −4.70 | −9.59 |
| | b* | −4.21 | −3.89 | −6.52 |
| | PE (%) | 99.50 | 99.48 | 99.32 |
| Lens1-4 | L* | 47.82 | 47.44 | 41.72 |
| | a* | −4.57 | −4.44 | −11.78 |
| | b* | −4.26 | −4.02 | −8.78 |
| | PE (%) | 99.32 | 99.20 | 99.12 |
| Lens1-5 | L* | 47.64 | 47.28 | 44.30 |
| | a* | −4.70 | −4.55 | −14.04 |
| | b* | −4.78 | −4.42 | −8.65 |
| | PE (%) | 99.61 | 99.63 | 99.49 |
| Mean | L* | 46.89 | 46.51 | 42.49 |
| | a* | −4.87 | −4.80 | −12.14 |
| | b* | −5.12 | −4.85 | −8.25 |
| | PE (%) | 99.54 | 99.51 | 99.31 |
| max-min | L* | 2.24 | 2.17 | 7.02 |
| | a* | 0.90 | 1.01 | 4.45 |
| | b* | 2.61 | 2.68 | 2.77 |
| | PE (%) | 0.31 | 0.45 | 0.37 |

EXAMPLE 1

Manufacture of Multilayered (Colorless PVA/Film Support/Colored PVA) Curved-surface Formed Polarizing Film A triacetate cellulose (TAC) film (thickness 80 µm, German IPI Company, 11sg80uv380-LH(Soft)) was immersed in a 15% NaOH aqueous solution of 60° C. for 1 minute for saponification.

On one side of the saponificated TAC film, the colorless transparent PVA film of Preparation Example 3 was placed, and on the other side, the colored transparent PVA film of Preparation Example 1 was placed.

A polarizing film of colorless PVA/TAC/colored PVA structure was manufactured using the adhesive of Preparation Example 4, by roll-to-roll lamination. And then, on both sides, polyolefin-based protection films (Toray Industries, Inc. Toretec 7H52) were laminated.

The manufactured polarizing film while being laminated with protection films was punched to a diameter of 80.8 mm using a punching apparatus equipped with a punching blade, and from the polarizing film with 340 mm width and 1 m length, total 44 multilayered polarizing films were obtained. At the time of punching, in order to indicate polarization direction, it was punched so as to generate small unevenness at the boundary.

Thereafter, it was heated in an oven of 70° C. for 8 hours to remove remaining moisture, and simultaneously, to increase crystallinity, thus affording heat resistance.

And then, by the same method as Comparative Example 1, total 44 curved-surface formed multilayered polarizing films were obtained using a hot press curved-surface forming machine, and among them, except 2 with minutely distorted curved-surfaces, 42 normal multilayered polarizing films were obtained.

The hot press curved-surface forming machine with a convex downward structure was located such that the colored PVA film side faces downward, and the forming temperature was 102° C.

5 samples were randomly taken, and changes in color coordinate and polarization rate before and after forming were measured.

Manufacture of Polarizing Lens

Thereafter, the protection films of the multilayered polarizing film were delaminated, and by the same method as Comparative Example 1, 42 polarizing lens with 4Base shapes were obtained. It was confirmed that all the 42 polarizing lens show little color change and have very excellent appearance.

Among them, 5 were randomly taken, and broken with a hammer to confirm adhesion between the polarizing film and the urethane lens, as a result of which excellent adhesion with little scattering was confirmed.

In order to measure changes in colors and polarization rates of the lens manufactured by the above method, color coordinates and polarization rates after curved-surface forming were measured, and summarized in the following Table 2.

TABLE 2

| | D65/2 | Polarizing film before thermoforming | Polarizing film after thermoforming | Polarizing lens |
|---|---|---|---|---|
| Lens2-1 | L* | 47.41 | 47.11 | 41.54 |
| | a* | −5.19 | −4.99 | −5.13 |
| | b* | −4.88 | −5.11 | −6.34 |
| | PE (%) | 99.53 | 99.48 | 99.42 |
| Lens 2-2 | L* | 46.87 | 46.48 | 40.82 |
| | a* | −5.02 | −4.78 | −4.98 |
| | b* | −4.40 | −4.65 | −5.87 |
| | PE (%) | 99.51 | 99.46 | 99.42 |
| Lens 2-3 | L* | 47.98 | 47.62 | 41.81 |
| | a* | −5.31 | −5.13 | −5.28 |
| | b* | −5.09 | −5.30 | −6.52 |
| | PE (%) | 99.48 | 99.43 | 99.38 |
| Lens 2-4 | L* | 47.23 | 46.67 | 41.46 |
| | a* | −5.06 | −4.89 | −4.98 |
| | b* | −4.65 | −4.88 | −6.06 |
| | PE (%) | 99.54 | 99.50 | 99.41 |

TABLE 2-continued

| | D65/2 | Polarizing film before thermoforming | Polarizing film after thermoforming | Polarizing lens |
|---|---|---|---|---|
| Lens 2-5 | L* | 47.80 | 47.33 | 41.53 |
| | a* | −5.54 | −5.28 | −5.48 |
| | b* | −5.24 | −5.53 | −6.73 |
| | PE (%) | 99.35 | 99.28 | 99.22 |
| Mean | L* | 47.46 | 47.04 | 41.43 |
| | a* | −5.22 | −5.01 | −5.17 |
| | b* | −4.85 | −5.09 | −6.30 |
| | PE (%) | 99.48 | 99.43 | 99.37 |
| max-min | L* | 1.11 | 1.14 | 0.99 |
| | a* | 0.52 | 0.50 | 0.50 |
| | b* | 0.84 | 0.88 | 0.86 |
| | PE (%) | 0.19 | 0.22 | 0.20 |

EXAMPLE 2

Manufacture of Multilayered (Colored/Film Support/Colorless) Curved-surface Formed Polarizing Film With the saponificated TAC film on the center, on one side was placed the colored transparent PVA film of Preparation Example 1, and on the other side was placed the colorless transparent PVA film of Preparation Example 3.

Using the adhesive of Preparation Example 4, a polarizing film with a structure of colored PVA/TAC/colorless PVA was manufactured by roll-to-roll lamination.

And, total 43 multilayered polarizing films were obtained by the same method as Example 1, except that the hot press curved-surface forming machine was located such that the colorless transparent PVA film side faces downward.

Manufacture of Polarizing Lens

By the same method as Example 1, total 43 polarizing lens were obtained, and it was confirmed that all the obtained polarizing lens show little color change and have very excellent appearance.

Among them, 5 were randomly taken, and broken with a hammer to confirm adhesion between the polarizing film and the urethane lens, as a result of which excellent adhesion with little scattering was confirmed.

In order to measure changes in the colors and the polarization rates of the lens manufactured by the above method, color coordinates and polarization rates after curved-surface forming were measured, and summarized in the following Table 3.

TABLE 3

| | D65/2 | Polarizing film before thermoforming | Polarizing film after thermoforming | Polarizing lens |
|---|---|---|---|---|
| Lens 3-1 | L* | 47.32 | 46.91 | 41.15 |
| | a* | −5.1 | −4.85 | −5.01 |
| | b* | −4.92 | −5.21 | −6.85 |
| | PE (%) | 99.43 | 99.31 | 99.15 |
| Lens 3-2 | L* | 46.62 | 46.09 | 40.82 |
| | a* | −5.35 | −5.2 | −5.24 |
| | b* | −5.01 | −5.27 | −6.82 |
| | PE (%) | 99.39 | 99.32 | 99.17 |
| Lens 3-3 | L* | 47.04 | 46.37 | 41.24 |
| | a* | −4.98 | −4.75 | −4.7 |
| | b* | −4.64 | −4.78 | −6.55 |
| | PE (%) | 99.40 | 99.33 | 99.24 |
| Lens 3-4 | L* | 47.42 | 47.07 | 41.86 |
| | a* | −5.21 | −4.93 | −5.14 |
| | b* | −4.88 | −5.17 | −7.29 |
| | PE (%) | 99.52 | 99.41 | 99.24 |

TABLE 3-continued

| | D65/2 | Polarizing film before thermoforming | Polarizing film after thermoforming | Polarizing lens |
|---|---|---|---|---|
| Lens 3-5 | L* | 47.27 | 46.76 | 41.7 |
| | a* | −5.05 | −4.79 | −4.89 |
| | b* | −4.84 | −5.15 | −7.18 |
| | PE (%) | 99.48 | 99.33 | 99.24 |
| Mean | L* | 47.13 | 46.64 | 41.35 |
| | a* | −5.14 | −4.90 | −5.00 |
| | b* | −4.86 | −5.12 | −6.94 |
| | PE (%) | 99.44 | 99.34 | 99.21 |
| max-min | L* | 0.8 | 0.98 | 1.04 |
| | a* | 0.37 | 0.45 | 0.54 |
| | b* | 0.37 | 0.49 | 0.74 |
| | PE (%) | 0.13 | 0.10 | 0.09 |

EXAMPLE 3

Manufacture of Multilayered (Colored/Film Support/Colored) Curved-surface Formed Polarizing Film Total 44 multilayered polarizing films were obtained by the same method as Example 1, except that with the saponificated TAC film on the center, the colored transparent PVA film of Preparation Example 2 was applied on both sides to manufacture a polarizing film with a structure of colored PVA/TAC/colored PVA.

Manufacture of Polarizing Lens

Thereafter, by the same method as Example 1, total 44 polarizing lens were obtained, and it was confirmed that all the obtained 44 polarizing lens show little color change and have very excellent appearance.

Among them, 5 were randomly taken, and broken with a hammer to confirm adhesion between the polarizing film and the urethane lens, as a result of which excellent adhesion with little scattering was confirmed.

In order to measure changes in the colors and the polarization rates of the lens manufactured by the above method, color coordinates and polarization rates after curved-surface forming were measured, and summarized in the following Table 4.

TABLE 4

| | D65/2 | Polarizing film before thermoforming | Polarizing film after thermoforming | Polarizing lens |
|---|---|---|---|---|
| Lens 4-1 | L* | 60.28 | 59.92 | 55.80 |
| | a* | −0.45 | −0.25 | −0.39 |
| | b* | 2.72 | 2.51 | 1.52 |
| | PE (%) | 99.57 | 99.49 | 99.42 |
| Lens 4-2 | L* | 60.46 | 60.05 | 55.12 |
| | a* | −0.25 | −0.10 | 0.12 |
| | b* | 2.84 | 2.60 | 1.63 |
| | PE (%) | 99.54 | 99.45 | 99.38 |
| Lens 4-3 | L* | 59.89 | 59.40 | 55.36 |
| | a* | −0.62 | −0.35 | −0.21 |
| | b* | 2.48 | 2.29 | 0.90 |
| | PE (%) | 99.46 | 99.39 | 99.35 |
| Lens 4-4 | L* | 59.75 | 59.36 | 55.45 |
| | a* | −0.51 | −0.26 | −0.15 |
| | b* | 2.64 | 2.41 | 1.29 |
| | PE (%) | 99.60 | 99.54 | 99.48 |
| Lens 4-5 | L* | 60.32 | 59.87 | 55.38 |
| | a* | −0.36 | −0.13 | 0.12 |
| | b* | 3.04 | 2.80 | 1.41 |
| | PE (%) | 99.56 | 99.52 | 99.47 |

TABLE 4-continued

| D65/2 | | Polarizing film before thermoforming | Polarizing film after thermoforming | Polarizing lens |
|---|---|---|---|---|
| Mean | L* | 60.14 | 59.72 | 55.42 |
| | a* | −0.44 | −0.22 | −0.10 |
| | b* | 2.74 | 2.52 | 1.35 |
| | PE (%) | 99.55 | 99.48 | 99.42 |
| max-min | L* | 0.71 | 0.69 | 0.68 |
| | a* | 0.37 | 0.25 | 0.51 |
| | b* | 0.56 | 0.51 | 0.73 |
| | PE (%) | 0.14 | 0.15 | 0.13 |

EXAMPLE 4

Manufacture of Multilayered (Colorless/Film Support/Colored) Curved-surface Formed Polarizing Film Instead of a common transparent TAC, colored TAC (thickness 180 μm, German IPI Industries, Inc., 11sg180S02) was used, and on one side was placed the colorless transparent PVA film of Preparation Example 3, and on the other side was placed the colored transparent PVA film of Preparation Example 2.

Total 43 multilayered polarizing films were obtained by the same method as Example 1, except that a polarizing film with a structure of colorless PVA/TAC/colored PVA was obtained and used.

Manufacture of Polarizing Lens

Thereafter, by the same method as Example 1, total 43 polarizing lens were obtained, and it was confirmed that all the obtained polarizing lens show little color change and have very excellent appearance.

Among them, 5 were randomly taken, and broken with a hammer to confirm adhesion between the polarizing film and the urethane lens, as a result of which excellent adhesion with little scattering was confirmed.

In order to measure changes in the colors and the polarization rates of the lens manufactured by the above method, color coordinates and polarization rates after curved-surface forming were measured, and summarized in the following Table 5.

TABLE 5

| D65/2 | | Polarizing film Before thermoforming | Polarizing film After thermoforming | Polarizing lens |
|---|---|---|---|---|
| Lens 5-1 | L* | 48.99 | 48.52 | 44.51 |
| | a* | 0.21 | 0.45 | 0.23 |
| | b* | −5.97 | −6.16 | −7.08 |
| | PE (%) | 96.87 | 96.82 | 96.75 |
| Lens 5-2 | L* | 48.69 | 48.14 | 43.9 |
| | a* | 0.14 | 0.31 | 0.16 |
| | b* | −6.32 | −6.52 | −7.4 |
| | PE (%) | 96.91 | 96.86 | 96.79 |
| Lens 5-3 | L* | 49.14 | 48.68 | 44.82 |
| | a* | −0.11 | 0.16 | −0.08 |
| | b* | −5.82 | −6.06 | −6.96 |
| | PE (%) | 96.75 | 96.71 | 96.62 |
| Lens 5-4 | L* | 49.27 | 48.74 | 44.7 |
| | a* | 0.32 | 0.62 | 0.37 |
| | b* | −5.94 | −6.18 | −7.12 |
| | PE (%) | 96.72 | 96.65 | 96.57 |
| Lens 5-5 | L* | 48.75 | 48.15 | 44.12 |
| | a* | 0.09 | 0.22 | 0.15 |
| | b* | −6.12 | −6.38 | −7.35 |
| | PE (%) | 96.88 | 96.83 | 96.77 |

TABLE 5-continued

| D65/2 | | Polarizing film Before thermoforming | Polarizing film After thermoforming | Polarizing lens |
|---|---|---|---|---|
| Mean | L* | 48.97 | 48.45 | 44.41 |
| | a* | 0.13 | 0.35 | 0.17 |
| | b* | −6.03 | −6.26 | −7.18 |
| | PE (%) | 96.83 | 96.77 | 96.70 |
| max-min | L* | 0.58 | 0.6 | 0.92 |
| | a* | 0.43 | 0.46 | 0.45 |
| | b* | 0.5 | 0.46 | 0.44 |
| | PE (%) | 0.19 | 0.21 | 0.22 |

EXAMPLE 5

Manufacture of Multilayered (Colorless/Film Support/Colored) Curved-surface Formed Polarizing Film Instead of TAC, a polycarbonate (PC) film with a thickness of 180 μm (I-components Co., Ltd., CCL178) was used.

On one side of the PC film, the adhesive of Preparation Example 5 was slot-die coated and dried at 100° C. for 1 minute, and then, the colored transparent PVA film of Preparation Example 1 was laminated, and a polyolefin-based protection film (Toray Company, 7H52) was laminated, followed by ageing at room temperature for 2 days.

On the other side of the PC film, by the same method as above, the colorless transparent PVA film of Preparation Example 3 was laminated, and on that side, a polyolefin-based protection film (Toray Company, 7H52) was laminated to manufacture a polarizing film with a structure of colorless PVA/PC/colored PVA.

Thereafter, the polarizing film was aged at 35° C. for 40 hours, cut to a width of 340 mm and a length of 1 m, and additionally aged at 70° C. for 6 hours. And then, while laminated with the protection films, it was punched to 80.6 mm using a punching apparatus equipped with a punching blade with a diameter of 80.6 mm, thus obtaining total 44 sheets.

Total 44 multilayered polarizing films were obtained by the same method as Example 1, except that curved-surface forming was conducted at 130° C.

Manufacture of polarizing lens Thereafter, by the same method as Example 1, total 44 polarizing lens were obtained, and it was confirmed that all the obtained 44 polarizing lens show little color change and have very excellent appearance.

Among them, 5 were randomly taken, and broken with a hammer to confirm adhesion between the polarizing film and the urethane lens, as a result of which excellent adhesion with little scattering was confirmed.

In order to measure changes in the colors and the polarization rates of the lens manufactured by the above method, color coordinates and polarization rates after curved-surface forming were measured, and summarized in the following Table 6.

TABLE 6

| D65/2 | | Polarizing film before thermoforming | Polarizing film after thermoforming | Polarizing lens |
|---|---|---|---|---|
| Lens 6-1 | L* | 45.97 | 45.84 | 41.46 |
| | a* | −4.83 | −4.58 | −4.79 |
| | b* | −4.61 | −4.49 | −5.28 |
| | PE (%) | 99.35 | 99.34 | 99.29 |

TABLE 6-continued

| D65/2 | | Polarizing film before thermoforming | Polarizing film after thermoforming | Polarizing lens |
|---|---|---|---|---|
| Lens 6-2 | L* | 46.03 | 45.83 | 41.72 |
| | a* | −4.77 | −4.66 | −4.72 |
| | b* | −4.51 | −4.2 | −5.03 |
| | PE (%) | 99.33 | 99.31 | 99.26 |
| Lens 6-3 | L* | 45.85 | 45.73 | 41.48 |
| | a* | −4.85 | −4.7 | −4.80 |
| | b* | −4.62 | −4.51 | −4.55 |
| | PE (%) | 99.36 | 99.35 | 99.29 |
| Lens 6-4 | L* | 45.74 | 45.59 | 41.49 |
| | a* | −4.76 | −4.57 | −4.69 |
| | b* | −4.86 | −4.77 | −5.50 |
| | PE (%) | 99.34 | 99.3 | 99.26 |
| Lens 6-5 | L* | 46.12 | 46.03 | 41.47 |
| | a* | −4.72 | −4.41 | −4.61 |
| | b* | −4.91 | −4.77 | −5.48 |
| | PE(%) | 99.32 | 99.29 | 99.30 |
| Mean | L* | 45.94 | 45.80 | 41.52 |
| | a* | −4.79 | −4.58 | −4.72 |
| | b* | −4.70 | −4.55 | −5.17 |
| | PE | 99.34 | 99.32 | 99.28 |
| max-min | L* | 0.38 | 0.44 | 0.26 |
| | a* | 0.13 | 0.29 | 0.19 |
| | b* | 0.40 | 0.57 | 0.95 |
| | PE | 0.04 | 0.06 | 0.04 |

EXAMPLE 6

Manufacture of Multilayered (Colorless/Film Support/Colored) Curved-surface Formed Polarizing Film Instead of TAC, a polycarbonate (PC) film with a thickness of 180 μm (I-components, Co., Ltd., CCL178) was used.

95 wt % of phorocurable and thermosetting (dual curing type) insoluble adhesive (Japan UNIDIC Corporation, RC29-322), and 5 wt % of a curing agent (Japan UNIDIC Corporation, DN-980S) were stirred and used as an adhesive, and on one side was placed the colorless transparent PVA film of Preparation Example 3, and on the other side was placed the colored transparent PVA film.

After lamination, using a metal halide lamp, UV was irradiated at 1000 mJ/cm² to primarily cure, and on both sides of the manufactured polarizing film, a polyolefin-based protection films (Toray Corporation, Toretec 7A62) were laminated and wound.

Thereafter, it was aged in an oven of 35° C. for 40 hours, and cut to a width of 340 mm and a length of 1 m, and additionally aged at 70° C. for 6 hours. While the protection film laminated, it was punched to 80.6 mm using a punching apparatus equipped with a punching blade with a diameter of 80.6 mm, thus obtaining total 44 sheets.

Total 44 multilayered polarizing films were obtained by the same method as Example 1, except that curved-surface forming was conducted at 130° C.

Manufacture of Polarizing Lens

Thereafter, by the same method as Example 1, total 44 polarizing lens were obtained, and it was confirmed that all the obtained 44 polarizing lens show little color change and have very excellent appearance.

Among them, 5 were randomly taken, and broken with a hammer to confirm adhesion between the polarizing film and the urethane lens, as a result of which excellent adhesion with little scattering was confirmed.

In order to measure changes in the colors and the polarization rates of the lens manufactured by the above method, color coordinates and polarization rates after curved-surface forming were measured, and summarized in the following Table 7.

TABLE 7

| D65/2 | | Polarizing film Before thermoforming | Polarizing film After thermoforming | Polarizing lens |
|---|---|---|---|---|
| Lens 7-1 | L* | 45.97 | 45.70 | 41.49 |
| | a* | −4.83 | −4.66 | −4.81 |
| | b* | −4.61 | −4.56 | −5.46 |
| | PE (%) | 99.35 | 99.32 | 99.40 |
| Lens 7-2 | L* | 45.92 | 45.94 | 41.32 |
| | a* | −4.79 | −4.39 | −4.74 |
| | b* | −4.68 | −4.53 | −5.44 |
| | PE (%) | 99.42 | 99.38 | 99.50 |
| Lens 7-3 | L* | 45.88 | 45.84 | 41.26 |
| | a* | −4.87 | −4.62 | −4.83 |
| | b* | −4.62 | −4.43 | −5.53 |
| | PE (%) | 99.46 | 99.41 | 99.61 |
| Lens 7-4 | L* | 46.04 | 45.86 | 41.72 |
| | a* | −4.85 | −4.64 | −4.84 |
| | b* | −4.67 | −4.54 | −5.35 |
| | PE (%) | 99.30 | 99.37 | 99.33 |
| Lens 7-5 | L* | 45.65 | 45.44 | 41.13 |
| | a* | −4.72 | −4.48 | −4.65 |
| | b* | −4.53 | −4.44 | −4.65 |
| | PE (%) | 99.45 | 99.47 | 99.34 |
| Mean | L* | 45.89 | 45.76 | 41.38 |
| | a* | −4.81 | −4.56 | −4.77 |
| | b* | −4.62 | −4.50 | −5.29 |
| | PE (%) | 99.40 | 99.39 | 99.44 |
| max-min | L* | 0.39 | 0.50 | 0.59 |
| | a* | 0.15 | 0.27 | 0.19 |
| | b* | 0.15 | 0.13 | 0.88 |
| | PE (%) | 0.16 | 0.15 | 0.28 |

Referring to the results of Comparative Examples and Examples, it was confirmed that in the case of Comparative Examples, although raw material sheets of the same size were used, discarded parts were generated a lot in the processing.

It was also confirmed that in the case of Comparative Examples, inferior quality rate was high in the finally manufactured lens, and specifically, based on the number of finally manufactured lens, Comparative Examples showed final lens yield of less than about 40% compared to Examples (Comparative Examples 18: Examples 44).

It was also confirmed that in the case of Comparative Examples, discoloration remarkably appeared in the processes of PVA transparent film processing, lens shape processing (thermoforming), and final lens manufacture. On the average, in the case of Comparative Examples, in CIELAB color coordinate, before and after lens manufacture, differences of about 8 for a value and about 4 for b value were generated, and the deviations of L, a, b were also relatively large. And, for decrease in L value, reflectivity increase due to MR-8 resin with high refractive index should be considered, however the deviation was relatively large compared to Examples.

To the contrary, it was confirmed that in the case of Examples of the present invention, processibility was excellent, thus securing lens yield of about 2 times or more compared to Comparative Examples, and significant change in colors was not generated in the processing. Specifically, difference in a value was 0.5 or less and difference in b value was 2 or less, and compared to Comparative Examples, the range of change of a value decreased by about 16 times, and the range of change of b value decreased about 2 times or less.

REFERENCE NUMERALS

100: transparent film substrate
200: first polyvinyl alcohol-based resin layer
200': second polyvinyl alcohol-based resin layer
300: first adhesive layer
300': second adhesive layer

The invention claimed is:

1. A polarizing lens comprising:
a polarizing film; and
a urethane-based lens or a thiourethane-based lens,
wherein the polarizing film comprising
a transparent film substrate;
a first polyvinyl alcohol-based resin layer formed on one side of the transparent film substrate; and
a second polyvinyl alcohol-based resin layer formed on the other side of the transparent film substrate,
wherein at least one of the first and the second polyvinyl alcohol-based resin layers is a polarizing resin layer,
wherein the transparent film substrate and the first and the second polyvinyl alcohol-based resin layers are attached by an adhesive layer comprising a non-aqueous adhesive, an aqueous adhesive, or a mixture thereof, and
wherein one of the first and the second polyvinyl alcohol-based resin layers is directly adhered to the urethane-based lens or the thiourethane-based lens.

2. The polarizing lens according to claim 1, wherein the transparent film substrate includes one or more polymer resins selected from the group consisting of cellulose acetate-based resin, cellulose acetate butyrate-based resin, polyethylene terephthalate-based resin, (meth)acrylate-based resin, polycarbonate-based resin, and polyamide-based resin.

3. The polarizing lens according to claim 1, wherein the first and the second polyvinyl alcohol-based resin layers are identical or different, and each independently, a colorless transparent polyvinyl alcohol-based film, or a colored transparent polyvinyl alcohol-based film.

4. The polarizing lens according to claim 1, wherein the first polyvinyl alcohol-based resin layer is a colored transparent polyvinyl alcohol-based film and the second polyvinyl alcohol-based resin layer is a colorless transparent polyvinyl alcohol-based film.

5. The polarizing lens according to claim 1, wherein the transparent film substrate is a colorless transparent film substrate or a colored transparent film substrate.

6. The polarizing lens according to claim 1, wherein the one or more non-aqueous adhesives are selected from the group consisting of a polyol-based adhesive, a solvent type polyurethane-based adhesive, and a urethane acrylate-based adhesive.

7. The polarizing lens according to claim 1, wherein the one or more aqueous adhesives are selected from the group consisting of a polyvinyl alcohol-based adhesive, a polyethylene imine-based adhesive, a polycarboxylate-based adhesive, an epoxy-based adhesive, an aldehyde-based adhesive, and an water-dispersed polyurethane-based adhesive.

8. The polarizing lens according to claim 1, wherein the transparent film substrate has a thickness of 40 μm to 1,000 μm.

9. The polarizing lens according to claim 1, wherein the first and the second polyvinyl alcohol-based resin layers each independently have a thickness of 100 nm to 100 μm.

10. Polarizing eyeglasses comprising the polarizing lens according to claim 1.

* * * * *